United States Patent [19]

Kasugai et al.

[11] Patent Number: 4,572,396

[45] Date of Patent: Feb. 25, 1986

[54] CAP WITH VALVE

[75] Inventors: Joji Kasugai; Toru Kuniyoshi, both of Ichinomiya; Satoshi Toki, Inazawa, all of Japan

[73] Assignee: Toyoda Gosei Co., Ltd., Nishikasugai, Japan

[21] Appl. No.: 731,519

[22] Filed: May 7, 1985

[30] Foreign Application Priority Data

May 7, 1984 [JP] Japan .................................. 59-066879

[51] Int. Cl.[4] ........................ B65D 41/04; F16K 17/18
[52] U.S. Cl. .................................... 220/203; 220/204; 220/209
[58] Field of Search ....................... 220/203, 204, 209; 137/469

[56] References Cited

U.S. PATENT DOCUMENTS

| | | | |
|---|---|---|---|
| 3,820,680 | 6/1974 | Friend | 220/203 |
| 3,968,897 | 7/1976 | Rodgers | 220/204 |
| 4,051,975 | 10/1977 | Ohgida et al. | 220/203 |
| 4,091,955 | 5/1978 | Sloan, Sr. | 220/203 |

FOREIGN PATENT DOCUMENTS 566096 11/1958 Canada ................................ 220/209

Primary Examiner—Steven M. Pollard
Attorney, Agent, or Firm—Cushman, Darby & Cushman

[57] ABSTRACT

A cap with valve of the invention comprises a cap body having a fluid flow path with a stepped portion, a seal member disposed in the fluid flow path of the cap body and having outer and inner lip elements and making only the outer lip element abut on the stepped portion of the cap body, a support plate fixing the seal member and urging it to the stepped portion of the cap body and having a fluid flowing hole at the center, and a valve plate abutting on the inner lip element of the seal member and biased to close inner circumference of the inner lip element. An annular groove is formed at inner periphery of an opposite surface of the seal member to the support plate, and a stepped portion corresponding to the annular groove is formed on the support plate, thereby the seal member is fitted and fixed to the support plate through the annular groove and the stepped portion. A recess is formed on at least one of rear surface of the outer and inner lip elements and the support plate so that gap is produced at whole circumference of rear surface of the outer and inner lip elements of the seal member and the support plate at the non-pressed state of the seal member.

4 Claims, 9 Drawing Figures

CAP WITH VALVE

BACKGROUND OF THE INVENTION

1. Field of the Invention

The present invention relates to a cap with valve, such as a fuel cap or a radiator cap for automobiles, which is installed to an aperture of a container such as a fuel tank or a radiator and adjusts pressure in the container by flowing fluid such as air out of the container or into the container from outside when the pressure in the container is positive or negative.

2. Description of the Prior Art

FIG. 1 shows structure of a cap with valve in the prior art, for example, a fule cap to be installed to a filler neck of an automobile.

A fuel cap (hereinafter referred to as "cap") 1 in FIG. 1 is installed to a filler neck 10 of a fuel tank. A cap body 2 has a flow path 2a for fluid such as air and a stepped portion 2b formed on inner circumference of the flow path 2a. An annular seal member 3 is disposed in the flow path 2a and provided with lip elements 3a, 3b projecting in the same direction at outer and inner peripheries respectively, and the outer lip element 3a only is adapted to abut on the stepped portion 2b of the cap body 2. A support plate 4 is also disposed in the flow path 2a and provided at the center with a fluid flowing hole 4a so that the whole rear surface of the seal member 3 is adhered and the seal member 3 is biased by a spring 7 and urged to the stepped portion 2b of the cap body 2. Further, a valve plate 5 is disposed in the flow path 2a and abuts on the inner lip element 3b of the seal member 3 so that inner circumference of the inner lip element 3b is biased closable by a spring 8. In the cap 1, when pressure in the fuel tank is positive, the valve plate 6, the seal member 3 and the support plate 4 are elevated against the biasing force of the spring 7, and since the outer lip element 3a of the seal member 3 and the stepped portion 2b of the cap body 2 are separated from each other, fluid such as air in the tank flows through the gap between the outer lip element 3a and the stepped portion 2b. On the contrary, when the pressure in the fuel tank is negative, the valve plate 5 is lowered against the biasing force of the spring 8, and since the inner lip element 3b of the seal member 3 and the valve plate 5 are separated from each other, fluid such as air flows in the tank through the gap between the inner lip element 3b and the valve plate 5.

In this constitution of the prior art, however, in order that fluid such as air flows into or out of the tank at low pressure of 0.03~0.15 Kg/Cm$^2$ using the springs 7, 8 having low spring constant, the outer and inner lip elements 3a, 3b, the stepped portion 2b of the cap body 2, the valve plate 5, the rear surface of the seal member 3 and the support plate 4 must be high in surface precision (particularly undulation precision) and severe quality control is required for manufacturing the parts.

In order to fix the seal member 3 to the support plate 4 in the cap 1 of the prior art, means such as adhesion, welding of plating is utilized and therefore much process number is required to assemble the seal member 3 to the support plate 4 and the assembling cost becomes high.

Further in the cap 1 of the prior art, respective parts are assembled to the cap body 2 in sequence of the spring 8, the valve plate 5, the support plate 4 with the seal plate 3 fixed thereto, the spring 7, and the spring shoe plate 6. Since the outer and inner lip elements 3a, 3b of the seal member 3 are formed on the same plane in the conventional cap 1, when the valve plate 5 is assembled the valve plate 5 is positioned at upper side of the stepped portion 2b of the cap body 2 on account of the biasing force of the spring 8. When the support plate 4, the spring 7, the spring shoe plate 6 and the like are assembled later, the assembling may be effected in the state that outer circumference of the valve plate 5 remains to catch the stepped portion 2b of the cap body 2. This will cause the wrong assebling.

SUMMARY OF THE INVENTION

An object of the invention is to provide a cap with valve wherein a gap is formed at non-pressed state between whole circumference of rear surface of outer and inner lip elements in a seal member, even if surface precision is slightly low at parts such as a stepped portion of a cap body, outer and inner lip elements in the seal member and rear surface thereof, the support plate or a valve plate, the undulation can be absorbed by the gap and high seal performance of the valve can be maintained and the operation is possible even at low pressure, and the seal member can be fitted and assembled to the support plate thereby the assembling of the seal member to the support plate becomes easy and the cost becomes low.

Above object can be attained by a cap with valve comprising a cap body having a stepped portion on inner circumference of a fluid flow path, a seal member disposed in the fluid flow path of the cap body and having lip elements projecting in the same direction at outer and inner peripheries respectively and making only the outer lip element abut on the stepped portion of the cap body, a support plate fixing the seal member and urging it to the stepped portion of the cap body and provided at the center with a fluid flowing hole, and a valve plate abutting on the inner lip element of the seal member and biasing inner circumference of the inner lip element closable, wherein a recess is formed on at least one of rear surface of the outer and inner lip elements and the support plate so that gap is produced between whole circumference of rear surface of the outer and inner lip elements and the support plate at nonpressed state of the seal member, an annular groove is formed at inner periphery of opposite surface of the seal member to the support plate, the support plate is formed with a stepped portion corresponding to the annular groove of the seal member, and the annular groove of the seal member is fitted to the stepped portion of the support plate thereby the seal member is fixed to the support plate.

Another object of the invention is to provide a cap with valve, wherein the valve plate is disposed lower than the stepped portion of the cap body at assembling state of the valve plate, and when each member is assembled after assembling the valve plate, the valve plate is prevented from catching the stepped portion of the cap body so as to eliminate the wrong assembling of the valve plate or the like.

Above object can be attained by a ring body used as a seal member and having step difference so that the inner lip element is disposed lower than the outer lip element.

Above object is also attained in a constitution that the valve plate is biased through a spring by a spring shoe extending from lower side of the stepped portion of the cap body and provided at the center with a fluid flowing hole, the valve plate has a plurality of locking legs being engageable with the fluid flowing hole of the spring shoe, during the assembling, at first the locking legs are engaged with the fluid flowing hole of the spring shoe, the valve plate is previously disposed lower than the stepped portion of the cap body, various members are assembled to the cap body and then the locking legs are detached from the fluid flowing hole of the spring shoe and the valve plate is arranged at prescribed position.

Further in addition to above constitution, the support plate is biased through the spring by the spring shoe plate installed on inner circumference of the fluid flow path of the cap body and provided at the center with the fluid flowing hole, the support plate has a plurality of locking legs being engageable with the fluid flowing hole of the spring shoe plate, during the assembling, the spring is previously interposed and the support plate is assembled through the locking legs to the spring shoe plate, the valve plate is assembled to the spring shoe as already described, and the spring shoe plate is fitted to the fluid flow path of the cap body, and then the locking legs of the valve plate and the support plate are detached from the fluid flowing hole of the spring shoe and the spring shoe plate respectively so as to arrange various members in prescribed position, thereby the efficient assembling of various members can be attained.

DESCRIPTION OF PREFERRED EMBODIMENTS

Figure 1:
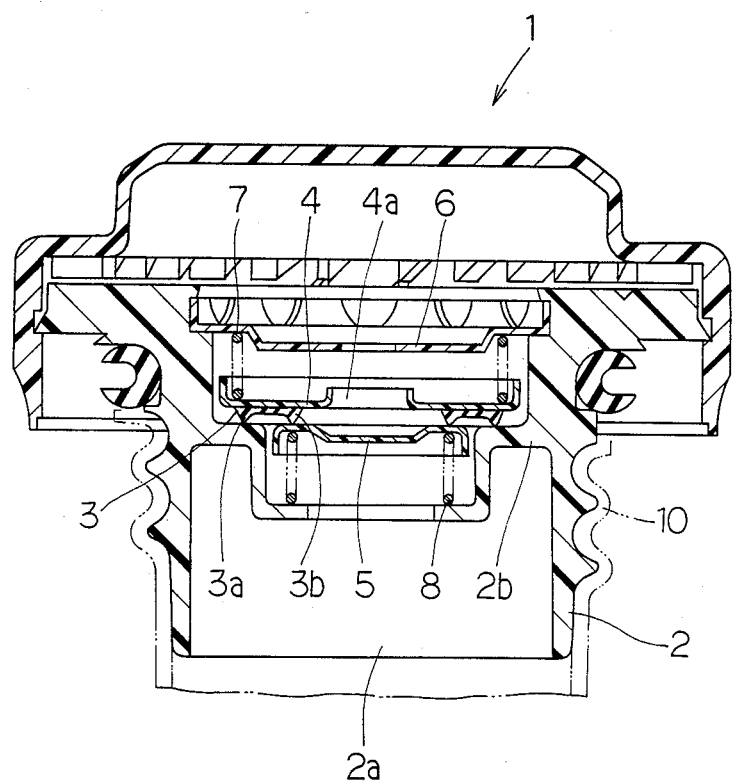
FIG. 1 is a sectional view of a cap with valve in the prior art.
Figure 2:
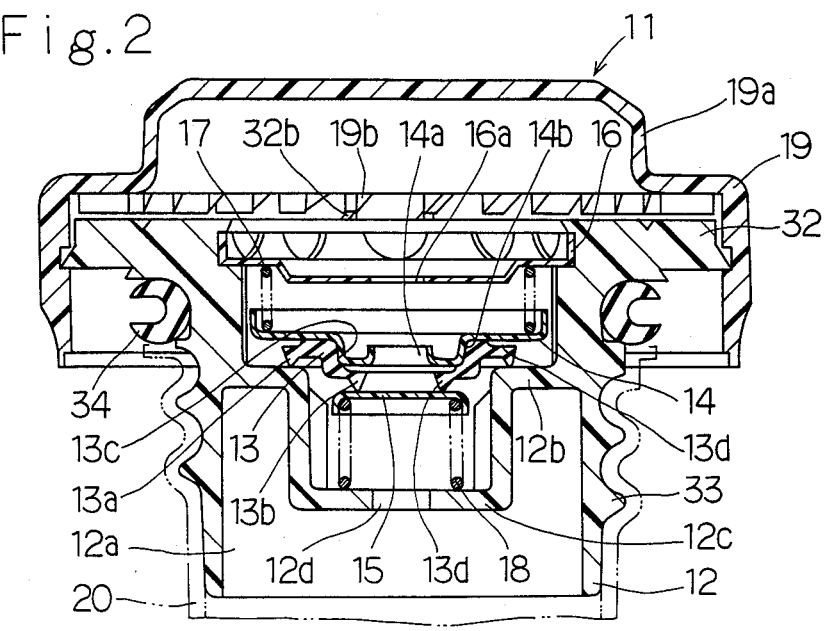
FIG. 2 is a sectional view of a cap with valve as a first embodiment of the invention.
Figure 3:
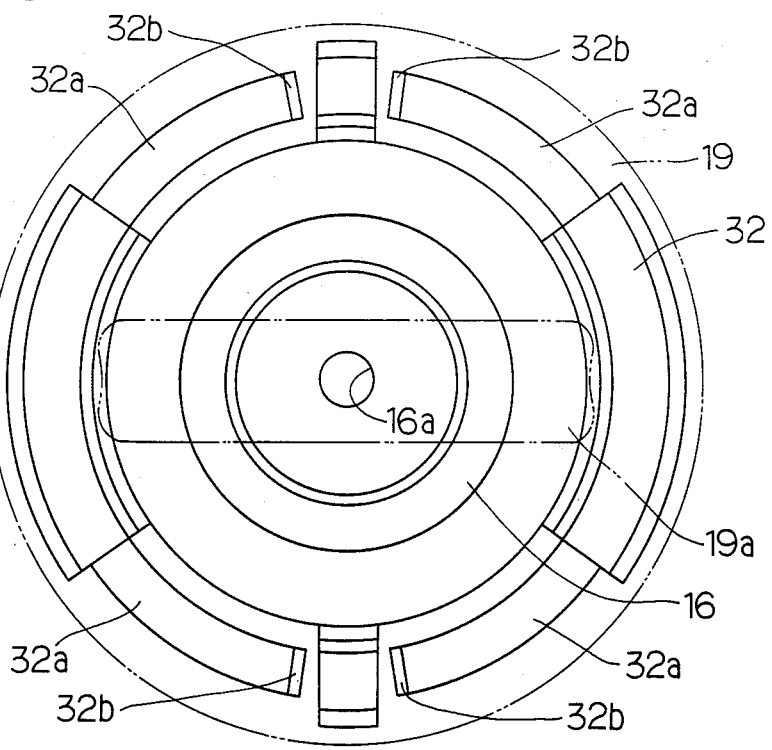
FIG. 3 is a plan view of the cap with valve of the first embodiment where an upper cover is removed.

A cap 11 with valve as a first embodiment of the invention is a fuel cap to be installed to a filler neck 20 of a fuel tank for an automobile. The cap 11 is composed of a cap body 12 made of plastic material such as polyacetal in nearly cylindrical form, and an upper cover 19 made of plastic material such as nylon in disc-like form and fitted to a flange 32 on upper end of the cap body 12 and provided with a grasping portion 19a. In order to prevent overtightening of the cap 11 to the filler neck 20, the upper cover 19 is formed at rear surface with a ratchet projection 19b, and a resilient finger 32a is formed at outer circumference of the flange 32 of the cap body 12 and provided at top end with a locking pawl 32b being engageable with the ratchet projection 19b.

A thread 33 for installing the filler neck 20 is provided on outer circumference of the cap body 12, and a seal ring 34 is installed on outside of lower surface of the flange 32.

A flow path 12a for fluid such as air in the tank is formed on inside of the cap body 12, and a stepped portion 12b is formed on inner circumference of the flow path 12a.

A seal member 13 of elastomer, a support plate 14 of plastic material such as polyacetal, a valve plate 15, a spring shoe plate 16 and coil springs 17, 18 are arranged in the flow path 12a.

Figure 4:
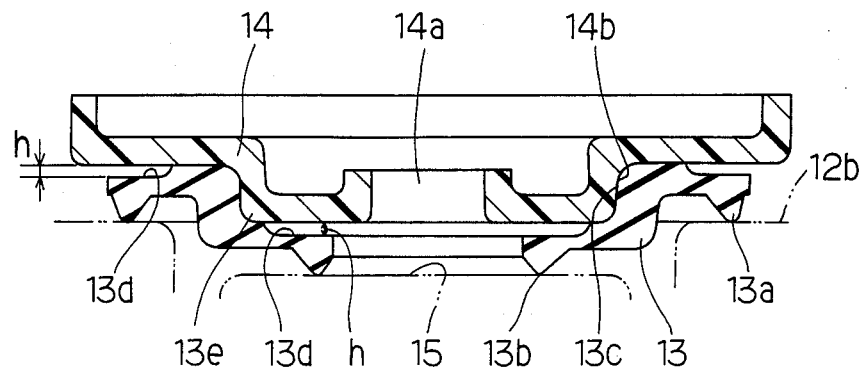
FIG. 4 is a sectional view of the first embodiment illustrating state of a seal member assembled to a support plate.
Figure 5:
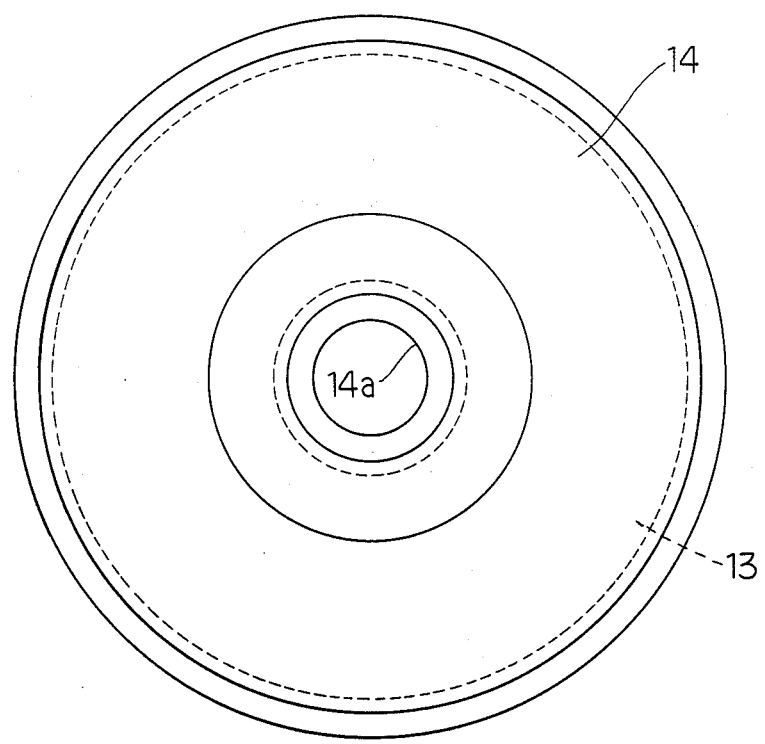
FIG. 5 is a plan view of the first embodiment illustrating state of the seal member assembled to the support plate.

As clearly seen in FIG. 4, the seal member 13 is a ring body comprising an outer lip element 13a and an inner lip element 13b projecting in the same direction at edge of outer and inner circumferences respectively, and step difference is formed so that the inner lip element 13b is disposed at lower side of the outer lip element 13a. Recesses 13d, 13d are formed on whole circumference of rear surface of the outer and inner lip elements 13a, 13b in the seal member 13 so that gap h is produced between the seal member 13 and the support plate 14 as hereinafter described at non-pressed state. Opposite surface of the seal member 13 to the support plate 14 as hereinafter described is formed at inner circumferential edge with a thick portion 13e being slightly thick in the seal member axial portion and an annular groove 13c.

The support plate 14 is a ring body formed with a fluid flowing hole 14a at the center and with a stepped portion 14b corresponding to the annular groove 13c of the seal member 13. The annular groove 13c fitted to the stepped portion 14b thereby the seal member 13 is fixed to the support plate 14. In this constitution, the assembling is simple and the cost can be reduced in comparison to conventional fixing method using an adhesive or the like.

Lower end of the coil spring 17 abuts on rear surface (upper surface) of the support plate 14 fixing the seal member 13, and upper end of the coil spring 17 is restricted by the spring shoe plate 16 of disc-like form fixed by undercut to upper inner circumference of the fluid flow path 12a in the cap body 12, thereby the outer lip element 13a in the seal member 13 is urged to the stepped portion 12b of the cap body 12. A fluid flow path hole 16a is formed at the center of the spring shoe plate 16.

The valve plate 15 of disc-like form to constitute the seal surface is biased by the coil spring 18 and abuts on the inner lip element 13b in the seal member 13, and closes inner circumference of the inner lip element 13b. Lower end of the coil spring 18 is restricted by the spring shoe 12c extending from lower side of the stepped portion 12b in the cap body 12. A fluid flow path hole 12d is formed at the center of the spring shoe 12c.

Valve operation of the cap 11 in the first embodiment will now be described.

Figure 6:
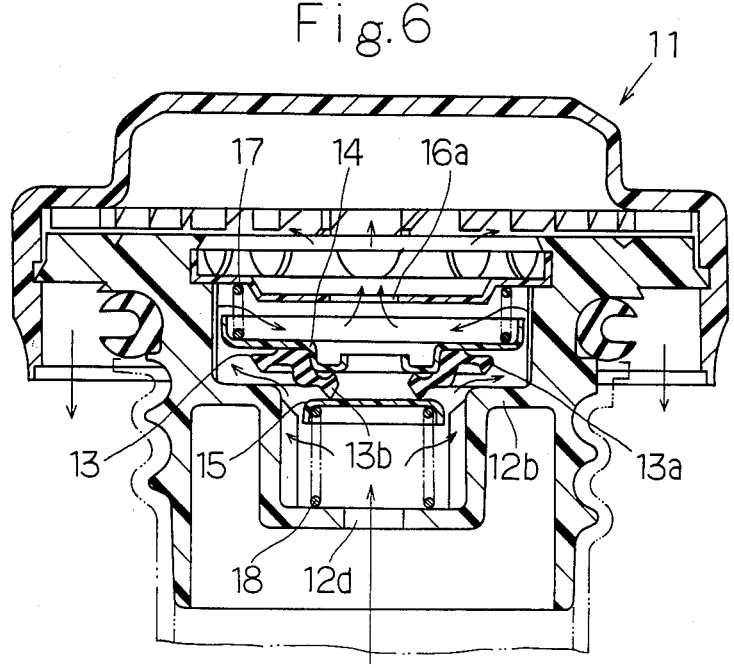
FIG. 6 is a sectional view of the cap with valve of the first embodiment illustrating state that pressure in a tank is positive.

When pressure in the tank is positive, as shown in FIG. 6, the support plate 14 fixing the seal member 13 against the biasing force of the spring 17 is elevated, and the outer lip element 13a of the seal member 13 and the stepped portion 12b of the cap body 12 are separated from each other so as to produce a gap between the outer lip element 13a and the stepped portion 12b, thereby fluid such as air in the tank flows through the fluid flowing hole 12d of the spring shoe and the fluid flowing hole 16a of the spring shoe plate and between the resilient finger 32a and the upper cover 19 into the atmosphere. In this case, the inner lip element 13b of the seal member 13 remains to abut on the valve plate 15. If the pressure in the tank becomes normal afterwards, the support plate 14 is lowered by the biasing force of the spring 17 and makes the outer lip element 13a of the seal member 13 abut on the stepped portion 12b of the cap body 12.

Figure 7:
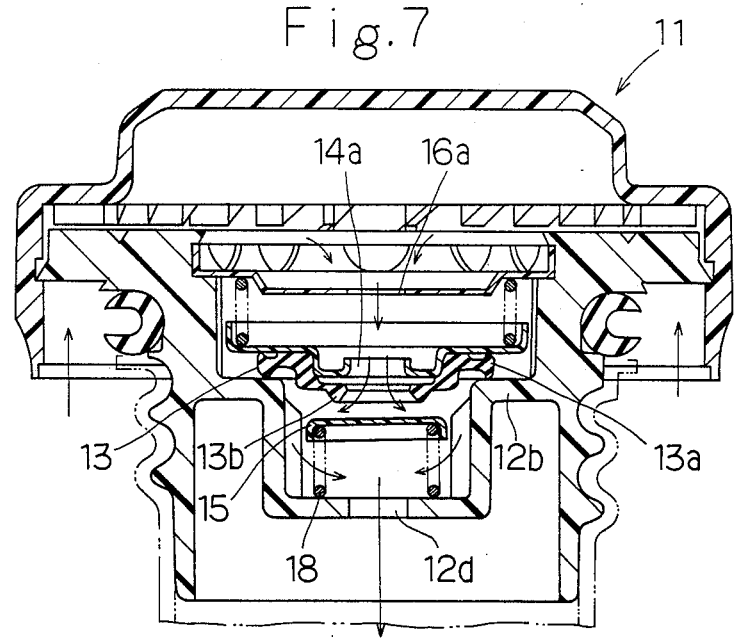
FIG. 7 is a sectional view of the cap with valve of the first embodiment illustrating state that pressure in the tank is negative.

On the contrary, when the pressure in the tank is negative, as shown in FIG. 7, the valve plate 15 is lowered against the biasing force of the spring 18 and the inner lip element 13b of the seal member 13 and the valve plate 15 are separated from each other so as to produce a gap between the inner lip element 13b and the valve plate 15, thereby fluid such as air flows between the resilient finger 32a and the upper cover 19 and through the fluid flowing hole 16a of the spring shoe plate, the fluid flowing hole 14a of the support plate and the fluid flowing hole 12d of the spring shoe into the tank. In this case, the outer lip element 13a of the seal member 13 remains to abut on the stepped portion 12b of the cap body 12. If the pressure in the tank becomes normal afterwards, the valve plate 15 is elevated by the biasing force of the spring 18 and abuts on the inner lip element 13b of the seal member 13.

As already described, pressure in the tank becomes positive or negative and fluid such as air flows out of or into the tank, and then the pressure in the tank becomes normal and the outer lip element 13a and the inner lip element 13b in the seal member 13 are urged to the stepped portion 12b of the cap body 12 and the valve plate 15 being respective seal surfaces, thereby gap h is produced between whole circumference of rear surface of the outer and inner lip elements 13a, 13b and the support plate 14 at non-pressed state. Even if surface precision is not so high in the outer and inner lip elements 13a, 13b and the stepped portion 12b, the valve plate 15 being respective seal surfaces, rear surface of the seal member 13, the support plate 14 and the like, the error can be absorbed by the gap h and high performance is obtained, and if the springs 17, 18 of low spring constant are used, the operation is possible even at low pressure.

In the first embodiment, in order to form air gap h between whole circumference of rear surface of the outer and inner lip elements 13a, 13b of the seal member 13 and the support plate 14 at non-pressed state, the recesses 13d, 13d are provided on rear side of the outer and inner lip elements 13a, 13b in the seal member 13, but recesses may be provided at side of the support plate 14.

Further in the first embodiment, the seal member 13 is formed to have the step difference so that the inner lip element 13b is disposed lower than the outer lip element 13a. However, the outer and inner lip elements 13a, 13b may be formed on the same level as long as gap h is formed between the support plate 14 and whole circumference of the outer and inner lip elements 13a, 13b at non-pressed state and the annular groove 13c is formed to be fitted to the prescribed stepped portion 14b of the support plate 14.

If the inner lip element 13b is disposed lower than the outer lip element 13a as shown in the first embodiment, when the valve plate 15 is assembled, the spring 18 can have such length that the valve plate 15 is disposed not higher than the stepped portion 12b of the cap body 12 but lower than the stepped portion 12b, thereby when various members are assembled after assembling the valve plate 15 there is no fear of assembling at the state that the valve plate 15 catches the stepped portion 12b of the cap body 12.

Figure 8:
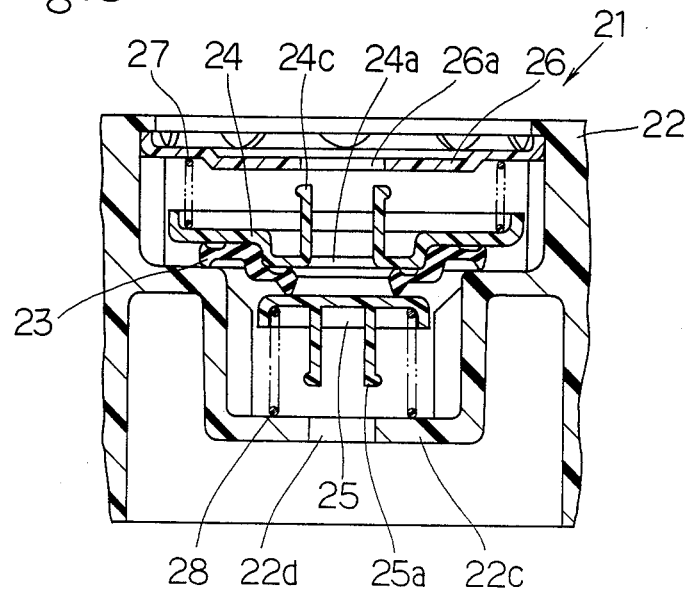
FIG. 8 is a sectional view of a cap with valve as a second embodiment.
Figure 9:
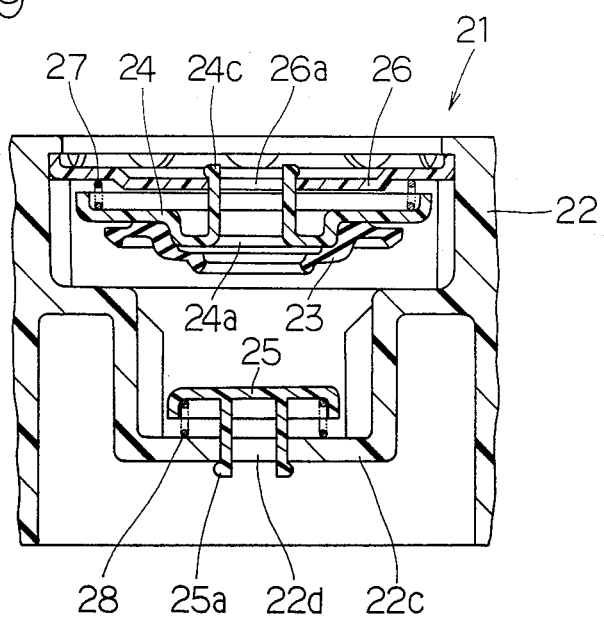
FIG. 9 is a sectional view of the cap with valve of the second embodiment illustrating the assembling state of various members.

In order to prevent the wrong assembling of the valve plate 15 or the like further and to assemble respective members simply and efficiently, constitution of the second embodiment as shown in FIG. 8 and FIG. 9 may be used.

A cap 21 in the second embodiment like the cap 11 in the first embodiment comprises a cap body 22, a seal member 23, a support plate 24, a valve plate 25, a spring shoe plate 26, and coil springs 27, 28, wherein the support plate 24 is formed with a plurality of locking legs 24c projecting upwards from periphery of a fluid flowing hole 24a of the support plate 24 and being engageable with a fluid flowing hole 26a of the spring shoe plate 26, and the valve plate 25 is formed with a plurality of locking legs 25a projecting downwards and being engageable with a fluid flowing hole 22d of a spring shoe 22c in the cap body 22.

Assembling of various members to the cap body 22 in the cap 21 of the second embodiment is performed as follows (refer to FIG. 9):

The support plate 24 fixing the seal member 23, the spring 27 and the spring shoe plate 26 are previously assembled by engaging the locking legs 24c of the support plate 24 with the fluid flowing hole 26.

The valve plate 25 is assembled to the spring shoe 22c of the cap body by engaging the locking legs 25a with the fluid flowing hole 22d of the spring shoe through the spring 28, and the spring shoe plate 26 assembling the support plate 24 is fixed by undercut to prescribed position on upper end of the cap body 22.

And then the locking legs 25a, 25c of the valve plate 25 and the support plate 24 are narrowed towards inside by elastic deformation and detached from the fluid flowing holes 22d, 26a in engaged state respectively, thereby each member is arranged to prescribed position by the biasing force of the springs 27, 28.

Accordingly, such constitution eliminates the wrong assembling of each member, and each member can be assembled simply and efficiently.

What is claimed is:

1. A cap with valve comprising:
  (a) a cap body having a fluid flow path and a stepped portion provided on the inner circumference of the fluid flow path;
  (b) a seal member of ring form disposed in the fluid flow path of said cap body and provided with lip elements projecting in the same direction at outer and inner peripheries respectively and with an annular groove on the inner perihery at the rear surface side of the outer and inner lip elements, said outer lip element only abutting on the stepped portion of the cap body;
  (c) a support plate disposed in the fluid flow path of said cap body and provided with a fluid flowing hole at the center and with a stepped portion to which the annular groove of the seal member is fitted, said annular groove being fitted to said stepped portion so as to fix the seal member, said seal member being urged to the stepped portion of said cap body;
  (d) a valve plate disposed in the fluid flow path of said cap body and abutting on the inner lip element of said seal member and biased to close the inner circumference of said inner lip element; and (e) a recess formed on at least one of the rear surfaces of said outer and inner lip elements and said support plate so that a gap is produced on the whole circumference of the rear surface of the outer and inner lip elements and the support plate in the non-pressed state of the seal member to the stepped portion of the cap body and the valve plate.

2. A cap with valve as set forth in claim 1, wherein said seal member is a ring body having a step difference so that the inner lip element is disposed lower than the outer lip element.

3. A cap with valve as set forth in claim 1, wherein said valve plate is biased through a spring by a spring shoe extending from the lower side of the stepped portion of said cap body and having a fluid flowing hole at the center, said valve plate having a plurality of locking legs being engageable with the fluid flowing hole of said spring shoe.

4. A cap with valve as set forth in claim 3, wherein said support plate is biased through a spring by a spring shoe plate fitted to the inner circumference of the fluid flow path of said cap body and having a fluid flowing hole at the center, said support plate having a plurality of locking legs being engageable with the fluid flowing hole of said spring shoe plate.

* * * * *